US008909937B2

(12) United States Patent
Ruan et al.

(10) Patent No.: US 8,909,937 B2
(45) Date of Patent: Dec. 9, 2014

(54) ACCESS CONTROL SYSTEM AND ACCESS CONTROL METHOD THEREOF

(75) Inventors: He-Ming Ruan, Kaohsiung (TW); Chin-Laung Lei, Taipei (TW); Yung-Chih Liu, Taipei (TW)

(73) Assignee: Institute for Information Industry, Taipei (TW)

( * ) Notice: Subject to any disclaimer, the term of this patent is extended or adjusted under 35 U.S.C. 154(b) by 540 days.

(21) Appl. No.: 13/324,090

(22) Filed: Dec. 13, 2011

(65) Prior Publication Data
US 2013/0132731 A1    May 23, 2013

(30) Foreign Application Priority Data
Nov. 21, 2011   (TW) .............................. 100142520 A (51) Int. Cl.
| | | |
|---|---|---|
| *H04L 9/32* | (2006.01) | |
| *H04L 9/30* | (2006.01) | |
| *G06F 21/34* | (2013.01) | |
| *H04L 29/06* | (2006.01) | |
| *G01D 4/00* | (2006.01) | |
| *H04L 9/08* | (2006.01) | |
| *G01R 22/06* | (2006.01) | |

(52) U.S. Cl.
CPC .............. *G01D 4/006* (2013.01); *H04L 9/3066* (2013.01); *G06F 21/34* (2013.01); *H04L 63/0838* (2013.01); *Y02B 90/243* (2013.01); *H04L 63/0869* (2013.01); *H04L 2209/38* (2013.01); *H04L 9/0866* (2013.01); *H04L 9/0869* (2013.01); *G01R 22/063* (2013.01); *Y04S 20/325* (2013.01)
USPC ............................ 713/184; 713/182; 713/185

(58) Field of Classification Search
CPC .... G01D 4/004; G01D 4/006; H04L 63/0838; H04L 63/0869; H04L 9/0866; H04L 9/0869; H04L 9/3066; G06F 21/34
USPC .......................................... 713/182, 184, 185
See application file for complete search history.

(56) References Cited

U.S. PATENT DOCUMENTS

| | | | |
|---|---|---|---|
| 7,259,690 B1 * | 8/2007 | Furmidge et al. ........ | 340/870.03 |
| 2011/0004764 A1 * | 1/2011 | Stuber ......................... | 713/176 |
| 2011/0074600 A1 * | 3/2011 | Cornwall et al. ........ | 340/870.02 |
| 2011/0109472 A1 * | 5/2011 | Spirakis et al. .......... | 340/870.02 |

OTHER PUBLICATIONS

Novel Approach for Remote Energy Meter Reading Using Mobile Agents; Tahboub et al; IEEE 2006.*
Hybrid Automatic Meter Reading System; Nayan et al; IEEE 2009.*

* cited by examiner

*Primary Examiner* — Luu Pham
*Assistant Examiner* — Jahangir Kabir
(74) *Attorney, Agent, or Firm* — Greer, Burns & Crain, Ltd.

(57) ABSTRACT

An access control system and an access control method thereof are provided. The access control system comprises a handheld device, an access control server and a terminal recording device. The handheld device has a user identification. The access control server is configured to store a user identification set, connect to the handheld device within a first time interval, determine that the user identification is included in the user identification set, generate a one-time password (OTP) seed set, and transmit the OTP seed set to the handheld device. The terminal recording device connects to the handhold device within a second time interval, and performs a two-way identification certification with the handheld device according to the OTP seed set so that the handheld device performs a data access to the terminal recording device after achieving the two-way identification certification.

10 Claims, 6 Drawing Sheets

ACCESS CONTROL SYSTEM AND ACCESS CONTROL METHOD THEREOF

This application claims the benefit of priority based on Taiwan Patent Application No. 100142520 filed on Nov. 21, 2011, which is hereby incorporated by reference in its entirety.

CROSS-REFERENCES TO RELATED APPLICATIONS

Not applicable.

BACKGROUND OF THE INVENTION

1. Field of the Invention

The present invention relates to an access control system and an access control method thereof. More particularly, the access control method of the present invention generates a one-time password (OTP) for use by a handheld device and a terminal recording device to perform a two-way identification certification therebetween so that the handheld device can access data of the terminal recording device after the two-way identification certification has been successfully completed.

2. Descriptions of the Related Art

An advanced metering infrastructure (AMI) system is a system comprising electricity meter devices, a communication system, a data management server and so on. The AMI system can measure and collect energy consumption information, and support pricing of consumers of the critical peak pricing (CPP) plan so that the users can know the energy consumption statuses and save energy. Additionally, the AMI system can further support fault detection, blackout management and consumer power consumption quality management, improve accuracy of the line loss calculation, reduce regional line congestions and reduce the unbalanced usage statuses.

Because the communication mechanism between the electricity meter devices and the data management server has such problems as instable network connection accessing capability, a low connection speed and a small data amount (i.e., in a limited connection status), it is not always possible for the remote data management server to keep stable connections with the electricity meter devices to exchange information. When the remote data management server fails to connect with the electricity meter devices, data access to the electricity meter devices must be accomplished manually at the near end. Most of conventional technologies of manually accessing the electricity meter devices adopt fixed keys to perform identification certification with the electricity meter devices. However, the invariable keys are easy to be divulged, cracked or stolen, so some people may deliberately access the electricity meter devices by using the fixed keys illegally.

In view of this, an urgent need exists in the art to provide an effective and safe way of certification for near-end accessing when the remote data management server fails to connects with an electricity meter device in a limited connection status.

SUMMARY OF THE INVENTION

An objective of the present invention is to provide an access control system and an access control method thereof. According to the access control system and the access control method thereof of the present invention, an access control server generates a one-time password (OTP) seed set and transmits the OTP seed set to a handheld device so that the handheld device generates an OTP according to the OTP seed set and performs a two-way identification certification with a terminal recording device. After the two-way identification certification is successfully completed, the handheld device can access data of the terminal recording device. Thereby, when being applied to an AMI system, the present invention allows for effective and safe accessing of a terminal recording device (i.e., an electricity meter device) by use of a handheld device, thus overcoming the drawbacks of the conventional practice of using a fixed key.

To achieve the aforesaid objective, the present invention discloses an access control system. The access control system comprises a handheld device, an access control server, and a terminal recording device. The handheld device has a user identification. The access control server is configured to store a user identification set, connect to the handheld device within a first time interval, determine that the user identification of the handheld device is included in the user identification set, generate a one-time password (OTP) seed set and transmit the OTP seed set to the handheld device. The terminal recording device is configured to connect to the handheld device within a second time interval and perform a two-way identification certification with the handheld device according to the OTP seed set so that the handheld device performs a data access to the terminal recording device after achieving the two-way identification certification.

To achieve the aforesaid objective, the present invention further discloses an access control method for use in the aforesaid access control system. The access control method comprises the following steps of: (a) enabling the handheld device to connect to the access control server within a first time interval; (b) enabling the access control server to determine that the user identification of the handheld device is included in the user identification set, generate an OTP seed set and transmit the OTP seed set to the handheld device; (c) enabling the handheld device to connect to the terminal recording device within a second time interval; and (d) enabling the handheld device and the terminal recording device to perform a two-way identification certification according to the OTP seed set so that the handheld device performs a data access to the terminal recording device after achieving the two-way identification certification.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention relates to an access control system and an access control method thereof. In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention, and the scope of the present invention shall be governed by the claims. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

The access control system of the present invention may be an advanced metering infrastructure (AMI) system, an oil pipeline leakage monitoring system, a long-distance transportation monitoring system, or any system that accesses and controls a terminal recording device through use of an access control server. For simplicity of the following descriptions, embodiments of the present invention will be described with reference to an AMI system. However, the technical means of the present invention may also be readily applied to other access control systems by those of ordinary skill in the art upon reviewing descriptions of these embodiments.

Figure 1:
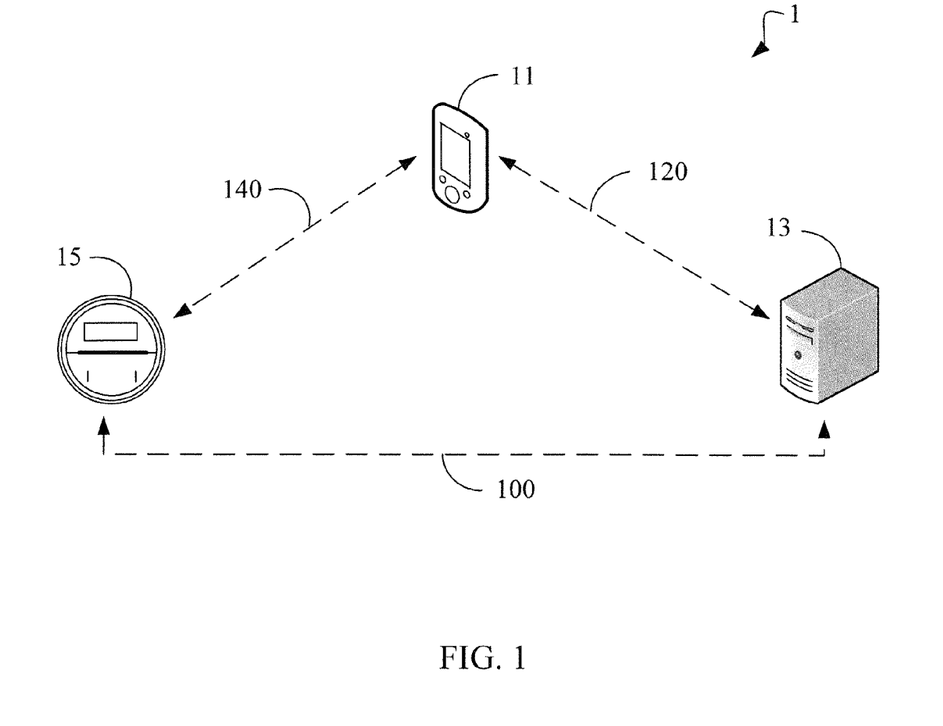
FIG. 1 is a schematic view of an AMI system 1 according to a first embodiment of the present invention.

FIG. 1 is a schematic view of an access control system 1 according to a first embodiment of the present invention. In this embodiment, the access control system 1 is just an AMI system 1, and will be termed as the AMI system 1 directly in the following descriptions. The AMI system 1 comprises a handheld device 11, an access control server 13 and a terminal recording device 15 (which is an electricity meter device 15 in this embodiment, and will be termed as the electricity meter device 15 directly in the following descriptions). The connection 100 between the access control server 13 and the electricity meter device 15 is in a limited connection status. The connection 100 may be implemented wirelessly or in a wired way, for example, through a General Packet Radio Service (GPRS) system, a third-generation (3G) mobile communication system, an Asymmetric Digital Subscriber Line (ADSL) system or some other cable system.

The connection 120 between the handheld device 11 and the access control server 13 may be implemented through near-field communication (NFC) or through a wireless or wired short-range transmission interface. Wired short-range transmission interfaces may include a Universal Serial Bus (USB) interface or an IEEE 1394 interface. Similarly, the connection 140 between the handheld device 11 and the electricity meter device 15 may also be implemented through near-field communication or through a short-range transmission interface. It shall be appreciated that, each of the handheld device 11, the access control server 13 and the electricity meter device 15 may comprise a storage module, a processor, a transceiver or the like; and for purpose of simplicity, descriptions of these elements will be omitted herein. Functions of these elements will be readily appreciated by those of ordinary skill in the art according to operations of the handheld device 11, the access control server 13 and the electricity meter device 15 described below.

The handheld device 11 may be a personal digital assistant (PDA), a smart mobile phone, a tablet computer or any device with storage and processing functions. The handheld device 11 has a user identification $ID_{STF}$ for identification certification with the access control server 13. It shall be appreciated that, different handheld devices have different user identifications; and for purpose of simplicity, only operations between the handheld device 11 and the access control server 13 and between the handheld device 11 and the electricity meter device 15 will be described in this embodiment. However, similar operations may also be applied to other handheld devices, and will not be further described herein. When the connection 100 between the access control server 13 and the electricity meter device 15 fails, it will be impossible for a user to access the electricity meter device 15 from the access control server 13 via the connection 100. In this case, the user must access the electricity meter device 15 by use of the handheld device 11 through short-range transmissions.

The access control server 13 stores a user identification set, and generates an OTP seed set. When the user uses the handheld device 11 to connect with the access control server 13 via the connection 120 within a first time interval, the access control server 13 determines whether the user identification $ID_{STF}$ of the handheld device 11 is included in the user identification set (i.e., whether the user identification $ID_{STF}$ is identical to one user identification in the user identification set). When the user identification $ID_{STF}$ of the handheld device 11 is included in the user identification set, the OTP seed set will be transmitted by the access control server 13 to the handheld device 11.

Then, the user moves to the remote electricity meter 15, and uses the handheld device 11 to connect with the electricity meter device 15 via the connection 140 within a second time interval. The electricity meter device 15 performs a two-way identification certification with the handheld device 11 according to the OTP seed set so that the handheld device 11 can access data of the electricity meter device 15 after the two-way identification certification has successfully completed. Specifically, when the access control server 13 accesses the electricity meter device 15 via the connection 100, the access control server 13 performs information synchronization with the electricity meter device 15. Therefore, when the access control server 13 and the electricity meter device 15 connect with the handheld device 11 within different time intervals respectively, the access control server 13 and the electricity meter device 15 will generate the OTP seed set according to the user identification $ID_{STF}$ of the handheld device 11 and the synchronized information so that the handheld device 11 and the electricity meter device 15 can use the OTP seed set to generate an OTP and perform a two-way identification certification therebetween by using the OTP. The OTP is generated through a predetermined calculation process, which may be simply one of the four fundamental operations, a hash operation or a table look-up operation; and this will be further appreciated by those of ordinary skill in the art after reviewing the following example of two-way identification certification.

The two-way identification certification of the present invention may be accomplished by a cryptography algorithm. As an example, the handheld device 11 has a first public key $Q_{STF}$ and a first private key $S_{STF}$. The first public key $Q_{STF}$ is generated from the user identification $ID_{STF}$ through a hash function operation, and the first private key $S_{STF}$ is an $s^{th}$ derivative element generated by a cyclic group with the first public key $Q_{STF}$ as a generator, as shown in Equation 1 below:

$$(PK_{STF}, SK_{STF}) = (Q_{STF}, S_{STF}) = (H(ID_{STF}), sH(ID_{STF})) \quad \text{(Equation 1)}$$

where, $PK_{STF}$ and $Q_{STF}$ are both used to represent the first public key, $SK_{STF}$ and $S_{STF}$ are both used to represent the first private key, $H(\cdot)$ represents a hash function, and $sH(\cdot)$ represents calculating the $s^{th}$ derivative element in a cyclic group G which uses the first public key $Q_{STF}$ as a generator. The hash function $H(\bullet):\{0,1\}^l \to G$, and G is a cyclic group having an order of p. As the cyclic group G and the hash function $H(\bullet)$ are commonly known in the art, no further description will be made thereon herein.

The access control server 13 has a second public key Y and a second private key s, and further stores a terminal key $SK_m$ (i.e., the electricity meter key $SK_m$ in this embodiment). The second private key s is included in a natural number set, and the second public key Y is generated according to a cyclic group generator (P) and the second private key as shown in Equation 2 below:

$$(PK_{ACS}, SK_{ACS}) = (Y,s) = (sP,s), s \in Z^*_p \quad \text{(Equation 2)}$$

where, $PK_{ACS}$ are Y both used to represent the second public key, $SK_{ACS}$ and s are both used to represent the second private key, P represents the generator of the cyclic group G, and $Z^*_p$ represents a prime number set among the natural numbers.

When the handheld device 11 connects with the access control server 13, the access control server 13 determines whether the user identification $ID_{STF}$ is included in the user identification set according to the first public key $Q_{STF}$ and the second private key s. Then, the access control server 13 performs a one-way calculation (e.g., a one-way hash function operation) on the environmental parameter and the user identification $ID_{STF}$ to generate a first OTP seed set $S_1$, performs a one-way hash function operation on the environmental parameter and the electricity meter key $SK_m$ to generate a second OTP seed set $S_2$, and transmits the first OTP seed set $S_1$ and the second OTP seed set $S_2$ to the handheld device 11.

The first OTP seed set $S_1$ is as shown in Equation 3 below:

$$S_1 = \{S_{1,d}, S_{1,d+1}, \ldots, S_{1,d+k}\}$$

$$S_{1,t} = h(PRG(L,t)\|ID_{STF}) \quad \text{(Equation 3)}$$

where, d, k and t are each an integer, $S_{1,t}$ represents one of the first OTP seeds in the first OTP seed set, $h(\bullet)$ represents a one-way hash function and $h(\bullet):\{0,1\}^* \to \{0,1\}^l$, $PRG(\bullet)$ represents a pseudo-random generator function, L represents a random value, the symbol t represents a time numeric value, the symbol $\|$ represents a concatenation. $PRG(L, t)$ is the environmental parameter, which is obtained by using L as an initial seed, making a calculation on the initial seed according to a specific arithmetic expression, and making calculations on the result repeatedly by t times according to the same specific arithmetic expression. $PRG:\{0,1\}^* \times \{0,1\}^* \to \{0,1\}^*$. As the pseudo-random generator function is commonly known in the art, no further description will be made thereon. In other embodiments, the pseudo-random generator function $PRG(\bullet)$ may also be replaced by other operational functions.

As described previously, when the access control server 13 accesses the electricity meter device 15 via the connection 100, the access control server 13 synchronizes information with the electricity meter device 15; here, the information synchronized is the random value L and the time numeric value t. The time numeric value t may be set as one of the hourly time intervals corresponding to the twenty four hours (e.g., the time numeric value t may be 0~23). That is, if the current time is between 1:00 to 1:59, then the time numeric value t is equal to 1; and if the current time is between 13:00 to 13:59, then the time numeric value t is equal to 13.

The second OTP seed set $S_2$ is as shown in Equation 4 below:

$$S_2 = \{S_{2,d}, S_{2,d+1}, \ldots, S_{2,d+k}\}$$

$$S_{2,t} = h(PRG(L,t)\|SK_m) \quad \text{(Equation 4)}$$

where, $S_{2,t}$ an OTP seed in the second OTP seed set, and $SK_m$ represents an electricity meter key. The electricity meter key $SK_m$ is stored in the access control server 13 and the electricity meter device 15 respectively.

After the handheld device 11 has received the first OTP seed set $S_1$ and the second OTP seed set $S_2$ from the access control server 13, the user can use the handheld device 11 to perform a two-way identification certification with the electricity meter device 13 within a second time interval and access the electricity meter device 13 after the two-way identification certification is completed.

Figure 2:
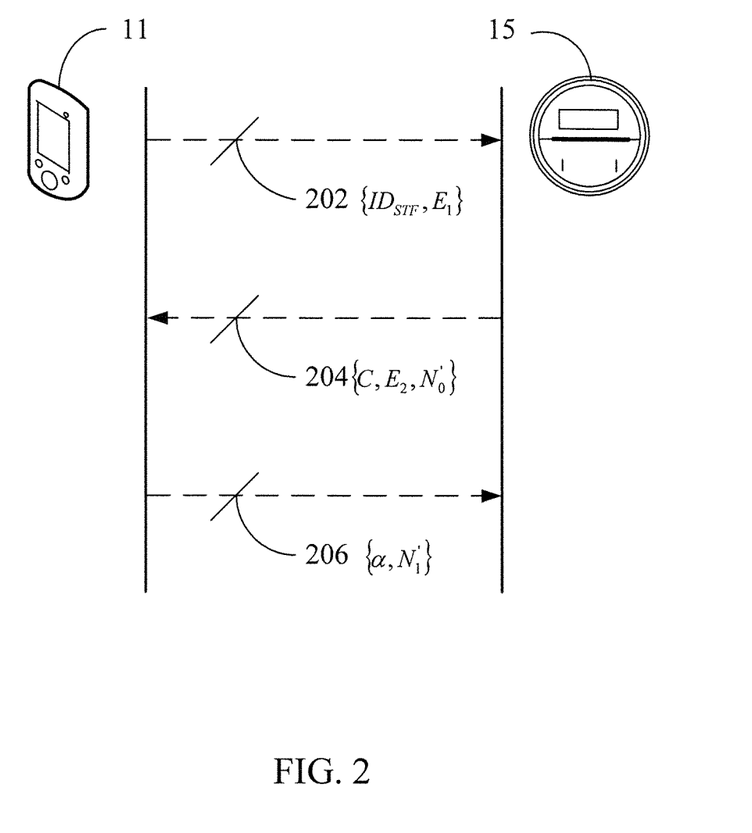
FIG. 2 illustrates message transmissions for two-way identification certification according to the first embodiment of the present invention.

Referring further to FIG. 2, message transmissions for two-way identification certification according to the present invention are illustrated therein. The two-way identification certification comprises an early-stage certification and a late-stage certification.

Firstly in the early-stage certification, the handheld device 11 transmits a first message 202 to the electricity meter device 13. The first message 202 comprises a first certification code $E_1$ and an identification certification code $ID_{STF}$. The handheld device 11 chooses an early-stage OTP seed $S_{2,t}$ from the second OTP seed set $S_2$ according to the time numeric value t, and performs an OTP generator function operation on the early-stage OTP seed $S_{2,t}$ to generate an early-stage OTP $OTP(S_{2,t})$. The first certification code $E_1$ is generated by the handheld device 11 by performing the one-way hash function operation on a first numeric value $N_0$ and performing a logic operation (e.g., an exclusive OR operation) on the operation result and the early-stage OTP $OTP(S_{2,t})$ as shown in Equation (5):

$$E_1 = OTP(S_{2,t}) \oplus h(N_0) \quad \text{(Equation 5)}$$

where, $N_0$ represents a first numeric value generated randomly, the symbol $\oplus$ represents an exclusive OR operation, $S_{2,t}$ represents an early-stage OTP in the second OTP seed set, $OTP(\bullet)$ represents an OTP generator function and $OTP:\{0,1\}^* \times \{0,1\}^* \to \{0,1\}^l$, and the early-stage OTP $OTP(S_{2,t})$ is generated from the early-stage OTP seed $S_{2,t}$ according to the OTP generator function. As the OTP generator function is commonly known by those of ordinary skill in the art, no further description will be made thereon herein.

Then when the first message 202 is received by the electricity meter device 15, the electricity meter device 15 performs the exclusive OR operation and a one-way hash function operation on the first certification code $E_1$ and the early-stage OTP $OTP(S'_{2,t})$ to generate a second numeric value $N'_0$ as shown in Equation 6:

$$N'_0 = h(OTP(S'_{2,t}) \oplus E_1) \quad \text{(Equation 6)}$$

where, the early-stage OTP $OTP(S'_{2,t})$ is generated from the early-stage seed $S'_{2,t}$ through the OTP generator function operation. It shall be appreciated that, because the electricity meter device 15 synchronizes the values of L and t with the access control server 13 and also receives the user identification $ID_{STF}$ from the handheld device 11, the electricity meter device 15 can calculate the OTP seed $S'_{2,t}$ through Equation 4 according to the user identification $ID_{STF}$, the environmental parameter $PRG(L,t)$ and the electricity meter key $SK_m$. Therefore, when the electricity meter device 15 is synchronized with the access control server 13 without any error, the OTP seed $S'_{2,t}$ is equal to the early-stage OTP seed $S_{2,t}$, and the early-stage OTP $OTP(S'_{2,t})$ is equal to the early-stage OTP $OTP(S_{2,t})$.

Additionally, the electricity meter device 15 further performs the one-way hash function operation on the environmental parameter $PRG(L, t)$ and the user identification $ID_{STF}$ to generate a late-stage OTP seed $S'_{1,t}$, and performs the OTP generator function operation on the late-stage OTP seed $S'_{1,t}$ to generate a late-stage OTP $OTP(S'_{1,t})$. Thereafter, the electricity meter device 15 generates a first key C and randomly generates a third numeric value $N_1$. The electricity meter device 15 performs a one-way hash function operation on the third numeric value $N_1$ and performs the exclusive OR operation on the operation result and the late-stage OTP $OTP(S'_{1,t})$ to generate a second certification code $E_2$. The first key C is generated according to Equation 7.

$$C = cP, c \in Z_P^* \qquad \text{(Equation 7)}$$

where, c is a numeric value in a prime number set $Z_P^*$. The first key C is generated according to the numeric value c and a cyclic group generator P. The second certification code $E_2$ is generated according to Equation 8.

$$E_2 = OTP(S'_{1,t}) \oplus h(N_1) \qquad \text{(Equation 8)}$$

where, $S'_{1,t}$ represents a late-stage OTP seed in the first OTP seed set, and is generated according to Equation 3. The electricity meter device 15 then transmits a second message 204 carrying the first key C, the second certification code $E_2$ and the second numeric value $N'_0$ to the handheld device 11. It shall be appreciated that, the second numeric value $N'_0$ is used for the early-stage certification, while the first key C and the second certification code $E_2$ are used for the late-stage identification certification.

After receiving the second message 202 comprising the first key C, the second certification code $E_2$ and the second numeric value $N'_0$ from the electricity meter device 15, the handheld device 11 firstly determines whether the second numeric value $N'_0$ is equal to a first verification value $h(h(N_0))$ generated by performing the one-way hash function operation on the first numeric value $N_0$ twice as shown in Equation 9.

$$N'_0 = h(h(N_0)) \qquad \text{(Equation 9)}$$

If the second numeric value $N'_0$ is equal to the first verification value $h(h(N_0))$, the handheld device 11 confirms that the early-stage certification is completed. Otherwise, if the second numeric value $N'_0$ is unequal to the first verification value $h(h(N_0))$, then the handheld device 11 determines that the early-stage certification fails and suspends the subsequent operations.

Upon completion of the early-stage certification, the handheld device 11 and the electricity meter device 15 perform the late-stage certification of the two-way identification certification process therebetween. During the late-stage certification, the handheld device 11 performs a bilinear mapping operation on the first private key $S_{STF}$ and the first key C to generate a second key $\alpha$. Additionally, the handheld device 11 further chooses a late-stage OTP seed $S_{1,t}$ from the first OTP seed set $S_1$ according to the time numeric value t, and performs an OTP generator function operation on the late-stage OTP seed $S_{1,t}$ to generate a late-stage OTP $OTP(S_{1,t})$, and performs the exclusive OR operation and the one-way hash function operation on the late-stage OTP seed $S_{1,t}$ to generate a fourth numeric value $N'_1$. The second key $\alpha$ is generated according to Equation 10.

$$\alpha = e(S_{STF}, C) \qquad \text{(Equation 10)}$$

where, $e(\cdot)$ represents the bilinear mapping operation function and $e: G \times G \rightarrow G_T$. As the bilinear mapping operation function is commonly known in the art, no further description will be made thereon herein. Additionally, the fourth numeric value $N'_1$ is generated according to Equation 11.

$$N'_1 = h(OTP(S_{1,t}) \oplus E_2) \qquad \text{(Equation 11)}$$

Similarly, as described above, when the electricity meter device 15 is synchronized with the access control server 13 without any error, the late-stage OTP seed $S_{1,t}$ is equal to the late-stage OTP seed $S'_{1,t}$, and the late-stage OTP $OTP(S'_{1,t})$ is equal to the late-stage OTP $OTP(S_{1,t})$. Then, the handheld device 11 transmits a third message 206 carrying the second key $\alpha$ and the fourth numeric value $N'_1$ to the electricity meter device 15. After receiving the third message 206 carrying the second key $\alpha$ and the fourth numeric value $N'_1$, the electricity meter device 15 firstly determines whether the fourth numeric value $N'_1$ is equal to a second verification value $h(h(N_1))$ generated by performing the one-way hash function operation twice on the third numeric value $N_1$ as shown in Equation 12:

$$N'_1 = h(h(N_1)) \qquad \text{(Equation 12)}$$

When the fourth numeric value $N'_1$ is equal to a second verification value $h(h(N_1))$, the electricity meter device 15 further determines whether a third key generated by performing a bilinear mapping operation on the first public key Y and the second public key is equal to the second key $\alpha$ as shown in Equation 13:

$$e(Y, cQ_{STF}) = \alpha \qquad \text{(Equation 13)}$$

where, $cQ_{STF\ 2}$ represents a numeric value obtained by performing an operation on the second public key $(Q_{STF})$ and the numeric value c.

If the third key $e(Y, cQ_{STF\ 2})$ is equal to the second key $\alpha$, the electricity meter device 15 confirms that the late-stage certification is completed. Thus, the two-way identification certification between the handheld device 11 and the electricity meter device 15 is completed, and the handheld device 11 can now begin to access data of the electricity meter device 15. On the other hand, if the fourth numeric value $N'_0$ is unequal to the second verification value $h(h(N_1))$ or the third key $e(Y, cQ_{STF\ 2})$ is unequal to the second key $\alpha$, then the electricity meter device 15 determines that the late-stage certification fails and suspends the subsequent operations to inhibit the handheld device 11 from accessing data thereof.

Figure 3:
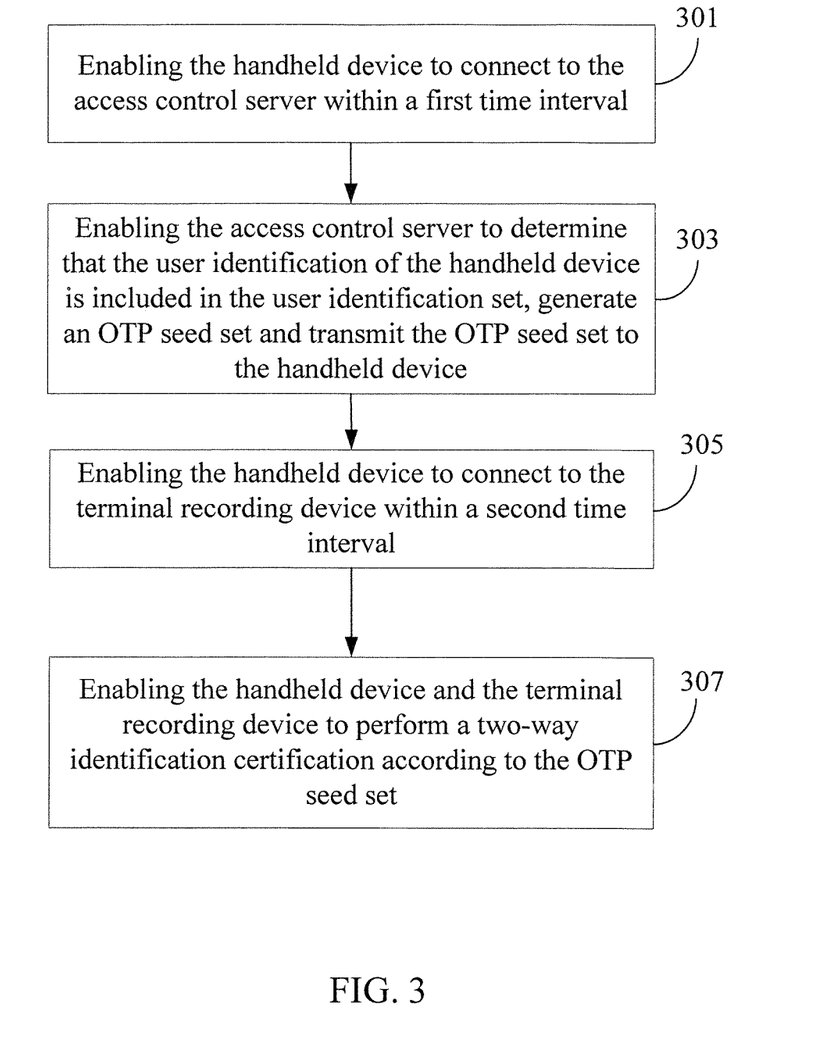
FIG. 3 is a flowchart diagram of an access control method according to a second embodiment of the present invention.

FIG. 3 is a flowchart diagram of an access control method according to a second embodiment of the present invention. The access control method is for use in an access control system, e.g., the AMI system 1 described in the first embodiment of the present invention. The access control system comprises a handheld device, an access control server and a terminal recording device. The handheld device has a user identification, and the access control server stores a user identification set.

Firstly, step 301 is executed to enable the handheld device to connect with the access control server within a first time interval. Then, step 303 is executed to enable the access control server to determine that the user identification of the handheld device 11 is included in the user identification set, generate an OTP seed set and transmit the OTP seed set to the handheld device. Next, step 305 is executed to enable the handheld device to connect to the terminal recording device within a second time interval. Finally, step 307 is executed to enable the handheld device and the terminal recording device 15 to perform a two-way identification certification according to the OTP seed set so that the handheld device can perform a data access to the terminal recording device after achieving the two-way identification certification.

In particular, the handheld device further has a first public key and a first private key, the access control server further has a second public key and a second private key, the terminal recording device further has a terminal key, and the OTP seed set comprises a first OTP seed set and a second OTP seed set.

The access control server and the terminal recording device have a random numeric value and a time numeric value synchronized therebetween through a limited remote connection.

Figure 4:
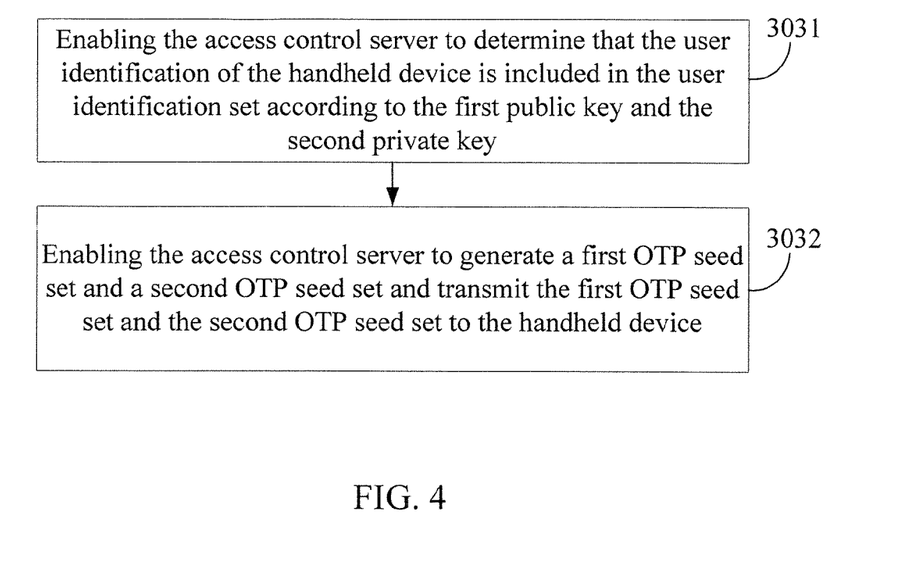
FIG. 4 is a flowchart diagram of a process through which a handheld device obtains an OTP seed set from an access control server according to the second embodiment of the present invention.

As shown in FIG. 4, the step 303 further comprises steps 3031 and 3032. Step 3031 is executed to enable the access control server to determine that the user identification of the handheld device is included in the user identification set according to the first public key and the second private key. Step 3032 is executed to enable the access control server to generate an environmental parameter according to the random numeric value and the time numeric value, perform a one-way calculation on the environmental parameter and the user identification to generate the first OTP seed set (i.e., as shown in Equation 3), perform the one-way calculation on the environmental parameter and the terminal key to generate the second OTP seed set (i.e., as shown in Equation 4), and transmit the first OTP seed set and the second OTP seed set to the handheld device.

Figure 5:
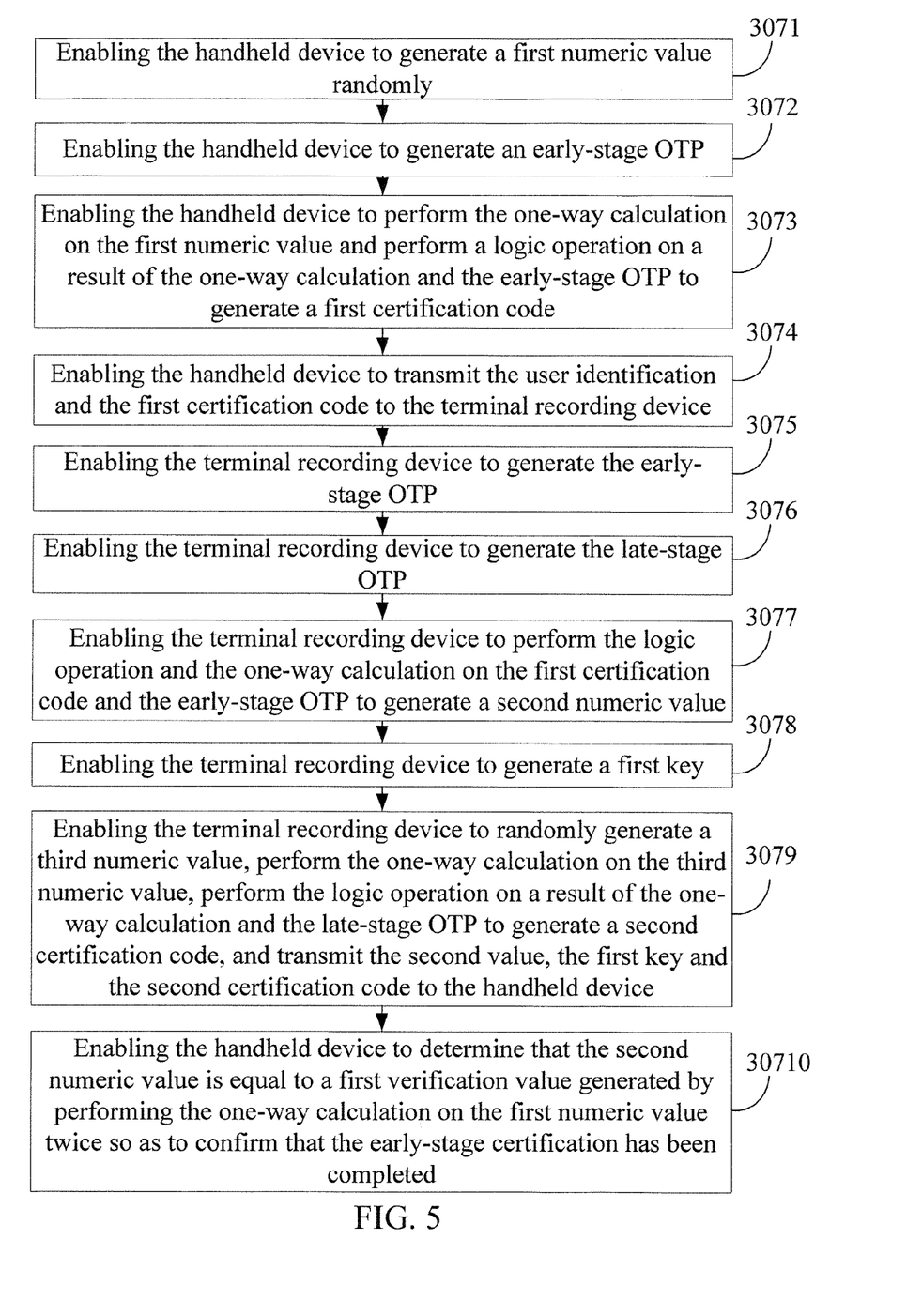
FIG. 5 is a flowchart diagram of an early-stage certification according to the second embodiment of the present invention.

The two-way identification certification comprises an early-stage certification and a late-stage certification. In the early-stage certification, the step 307 further comprises the steps 3071, 3072, 3073, 3074, 3075, 3076, 3077, 3078, 3079 and 30710 as shown in FIG. 5. Step 3071 is executed to enable the handheld device to generate a first numeric value randomly. Step 3072 is executed to enable the handheld device to choose an early-state OTP seed from the second OTP seed set according to the time numeric value, and perform an OTP generator function operation on the early-stage OTP seed to generate an early-stage OTP.

Step 3073 is executed to enable the handheld device to perform the one-way calculation on the first numeric value and perform a logic operation on a result of the one-way calculation and the early-stage OTP to generate a first certification code (i.e., as shown in Equation 5). Step 3074 is executed to enable the handheld device to transmit the user identification and the first certification code to the terminal recording device. Step 3075 is executed to enable the terminal recording device to perform the one-way calculation on the environmental parameter and the terminal key to generate the early-stage OTP seed after receiving the user identification and the first certification code from the handheld device, and perform the OTP generator function operation on the early-stage OTP seed to generate the early-stage OTP. Step 3076 is executed to enable the terminal recording device to perform the one-way calculation on the environmental parameter and the user identification to generate a late-stage OTP seed, and perform the OTP generator function operation on the late-stage OTP seed to generate the late-stage OTP.

Step 3077 is executed to enable the terminal recording device to perform the logic operation and the one-way calculation on the first certification code and the early-stage OTP to generate a second numeric value (i.e., as shown in Equation 6). Step 3078 is executed to enable the terminal recording device to generate a first key (i.e., as shown in Equation 7). Step 3079 is executed to enable the terminal recording device to randomly generate a third numeric value, perform the one-way calculation on the third numeric value, perform the logic operation on a result of the one-way calculation and the late-stage OTP to generate a second certification code (i.e., as shown in Equation 8), and transmit the second value, the first key and the second certification code to the handheld device. Step 30710 is executed to enable the handheld device to determine that the second numeric value is equal to a first verification value generated by performing the one-way calculation on the first numeric value twice (i.e., as shown in Equation 9) so as to confirm that the early-stage certification has been completed.

Figure 6:
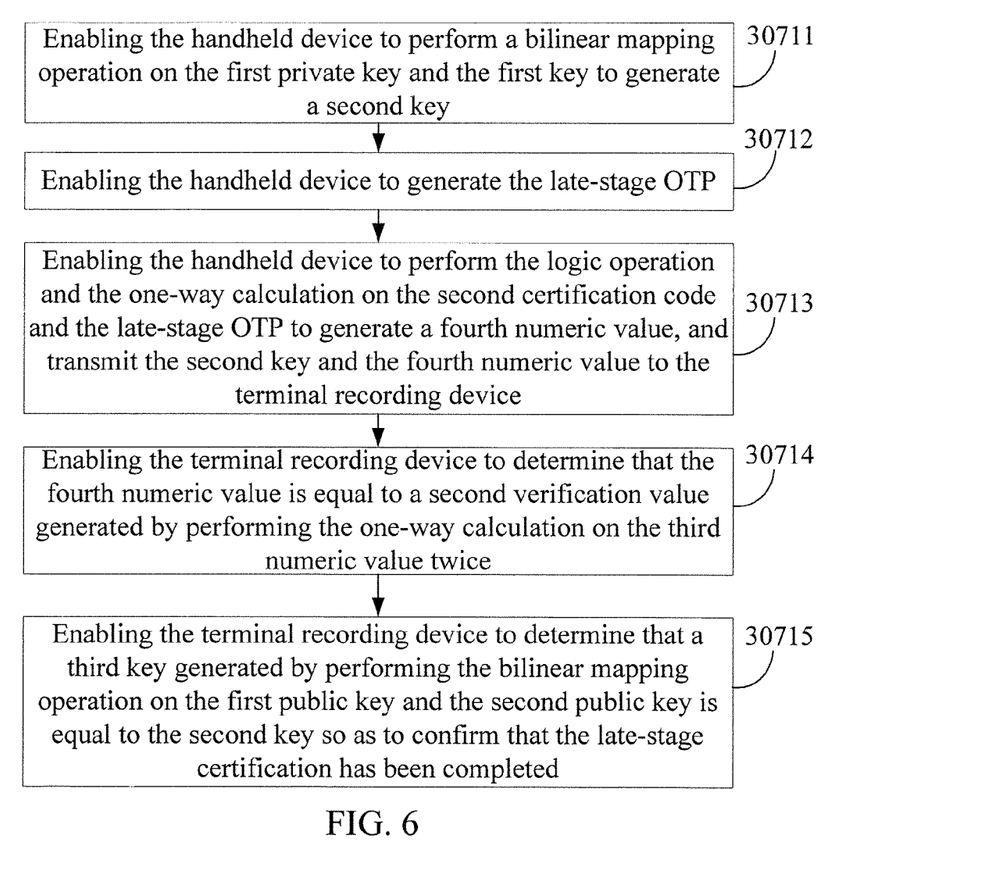
FIG. 6 is a flowchart diagram of a late-stage certification according to the second embodiment of the present invention.

In the late-stage certification, the step 307 further comprises steps 30711, 30712, 30713, 30714 and 30715 as shown in FIG. 6. Step 30711 is executed to enable the handheld device to perform a bilinear mapping operation on the first private key and the first key to generate a second key (i.e., as shown in Equation 10). Step 30712 is executed to enable the handheld device to choose the late-stage OTP seed from the first OTP seed set according to the time numeric value, and perform the OTP generator function operation on the late-stage OTP seed to generate the late-stage OTP. Step 30713 is executed to enable the handheld device to perform the logic operation and the one-way calculation on the second certification code and the late-stage OTP to generate a fourth numeric value (i.e., as shown in Equation 11), and transmit the second key and the fourth numeric value to the terminal recording device.

Step 30714 is executed to enable the terminal recording device to determine that the fourth numeric value is equal to a second verification value generated by performing the one-way calculation on the third numeric value twice (i.e., as shown in Equation 12). Step 30715 is executed to enable the terminal recording device to determine that a third key generated by performing the bilinear mapping operation on the first public key and the second public key is equal to the second key (i.e., as shown in Equation 13) so as to confirm that the late-stage certification has been completed.

It shall be appreciated that, the aforesaid logic operation may be an exclusive OR operation, and the one-way calculation may be a one-way hash function operation. The first public key is generated by inputting the user identification to a hash function, and the first private key is generated according to the first public key and a cyclic group. In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above descriptions of the access control system and the access control method thereof of the present invention, the handheld device acquires an OTP seed set from the access control server and performs a two-way identification certification with a terminal recording device according to the OTP seed set so that the handheld device can access data of the terminal recording device after the two-way identification certification is successfully completed. Thereby, the present invention can provide an effective and safe certification mechanism when the access control server is unable to access the remote terminal recording device in a limited connection status, thus overcoming the drawbacks of the conventional practice of using a fixed key.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. An access control system, comprising:
   a handheld device is configured for storing a user identification;
   an access control server, is configured for:
      storing a user identification set, connecting to the handheld device within a first time interval, determining that the user identification of the handheld device is included in the user identification set, generating a one-time password (OTP) seed set, and transmitting the OTP seed set to the handheld device; and a terminal recording device is configured for:

connecting to the handheld device within a second time interval, and performing a two-way identification certification with the handheld device according to the OTP seed set, enabling the handheld device for performing a data access to the terminal recording device after achieving the two-way identification certification, wherein the handheld device is further configured for:

storing a first public key and a first private key, wherein the access control server is further configured for:

storing a second public key and a second private key, wherein the terminal recording device is further configured for:

storing a terminal key, and the OTP seed set comprises a first OTP seed set and a second OTP seed set;

wherein the access control server and the terminal recording device are further configured for:

storing a random numeric value and a separate time numeric value, said values are synchronized through a predefined remote connection between the access control server and the terminal recording device; and wherein the access control server is further configured for:

storing the terminal key, determining that the user identification of the handheld device is included in the user identification set according to the first public key and the second private key, generating an environmental parameter according to the random value and the time numeric value, performing a one-way calculation on the environmental parameter and the user identification to generate the first OTP seed set, performing a one-way calculation on the environmental parameter and the terminal key to generate the second OTP seed set, and transmitting the first OTP seed set and the second OTP seed set to the handheld device.

2. The access control system as claimed in claim 1, wherein the two-way identification certification comprises an early-stage certification and a late-stage certification; and in the early-stage certification, the handheld device is further configured for:

generating a first numeric value randomly;

choosing an early-state OTP seed from the second OTP seed set according to the time numeric value, and performing an OTP generator function operation on the early-stage OTP seed to generate an early-stage OTP, performing the one-way calculation on the first numeric value and performing a logic operation on a result of the one-way calculation and the early-stage OTP to generate a first certification code, and transmitting the user identification and the first certification code to the terminal recording device;

the terminal recording device is further configured for, after receiving the user identification and the first certification code:

generating the environmental parameter according to the random numeric value and the time numeric value, performing the one-way calculation on the environmental parameter and the terminal key to generate the early-stage OTP seed, performing the OTP generator function operation on the early-stage OTP seed to generate the early-stage OTP, performing the one-way calculation on the environmental parameter and the user identification to generate a late-stage OTP seed, performing the OTP generator function operation on the late-stage OTP seed to generate the late-stage OTP, performing the logic operation and the one-way calculation on the first certification code and the early-stage OTP to generate a second numeric value;

generating a first key, randomly generating a third numeric value, performing the one-way calculation on the third numeric value and performing the logic operation on a result of the one-way calculation and the late-stage OTP to generate a second certification code, and transmitting the second numeric value, the first key and the second certification code to the handheld device;

the handheld device is further configured for, after receiving the second numeric value, the first key and the second certification code:

determining that the second numeric value is equal to a first verification value generated by performing the one-way calculation on the first numeric value twice so as to confirm that the early-stage certification has been completed;

the handheld device is further configured for, in the late-stage certification:

performing a bilinear mapping operation on the first key and the first private key to generate a second key;

choosing the late-stage OTP seed from the first OTP seed set according to the time numeric value, and performing the OTP generator function operation on the late-stage OTP seed to generate the late-stage OTP;

performing the logic operation and the one-way calculation on the second certification code and the late-stage OTP to generate a fourth numeric value; and transmitting the second key and the fourth numeric value to the terminal recording device;

the terminal recording device is further configured for, after receiving the second key and the fourth numeric value:

determining that the fourth numeric value is equal to a second verification value generated by performing the one-way calculation on the third numeric value twice; and determining that a third key generated by performing the bilinear mapping operation on the first public key and the second public key is equal to the second key so as to confirm that the late-stage certification has been completed.

3. The access control system as claimed in claim 2, wherein the first public key is generated by inputting the user identification into a hash function, and the first private key is generated according to the first public key and a cyclic group.

4. The access control system as claimed in claim 2, wherein the logic operation is an exclusive OR (XOR) operation.

5. The access control system as claimed in claim 2, wherein the one-way calculation is a one-way hash function operation.

6. An access control method for use in an access control system, the access control system comprising a handheld device, an access control server and a terminal recording device, the handheld device storing a user identification, and the access control server storing a user identification set, the access control method comprising the following steps of:

(a) connecting the handheld device to the access control server within a first time interval;

(b) operating the access control server to determine that the user identification of the handheld device is included in the user identification set, generating a one-time password (OTP) seed set and transmitting the OTP seed set to the handheld device;

(c) connecting the handheld device to connect to the terminal recording device within a second time interval;

(d) performing a two-way identification certification with the handheld device and the terminal recording device according to the OTP seed set so that the handheld device performs a data access to the terminal recording device after achieving the two-way identification certification;

(e) storing, in memory of the handheld device, a first public key and a first private key;

storing, in memory of the access control server, a second public key and a second private key;

storing a terminal key, and the OTP seed set comprises a first OTP seed set and a second OTP seed set;

storing, in memory of the access control server and the terminal recording device, a random numeric value and a separate time numeric value, said values are synchronized through a predefined remote connection between the access control server and the terminal recording device;

storing the terminal key in the access control server; determining, using the access control server, that the user identification of the handheld device is included in the user identification set according to the first public key and the second private key; and (f) generating, using the access control server, an environmental parameter according to the random numeric value and the time numeric value; performing a one-way calculation on the environmental parameter and the user identification to generate the first OTP seed set; performing the one-way calculation on the environmental parameter and the terminal key to generate the second OTP seed set; and transmitting the first OTP seed set and the second OTP seed set to the handheld device.

7. The access control method as claimed in claim 6, wherein the two-way identification certification comprises an early-stage certification and a late-stage certification; and in the early-stage certification, the step (d) further comprises the following steps:

(d1) generating, using the handheld device, a first numeric value randomly;

(d2) choosing, using the handheld device, an early-state OTP seed from the second OTP seed set according to the time numeric value, and performing an OTP generator function operation on the early-stage OTP seed to generate an early-stage OTP;

(d3) performing, using the handheld device, the one-way calculation on the first numeric value and performing a logic operation on a result of the one-way calculation and the early-stage OTP to generate a first certification code; and (d4) transmitting the user identification and the first certification code from the handheld device to the terminal recording device;

(d5) performing, using the terminal recording device the one-way calculation on the environmental parameter and the terminal key to generate the early-stage OTP seed after receiving the user identification and the first certification code from the handheld device, and performing the OTP generator function operation on the early-stage OTP seed to generate the early-stage OTP;

(d6) calculating, using the terminal recording device the one-way calculation on the environmental parameter and the user identification to generate a late-stage OTP seed, and performing the OTP generator function operation on the late-stage OTP seed to generate the late-stage OTP;

(d7) performing, using the terminal recording device, the logic operation and the one-way calculation on the first certification code and the early-stage OTP to generate a second numeric value;

(d8) generating a first key using the terminal recording device;

(d9) randomly generating, using the terminal recording device, a third numeric value, performing the one-way calculation on the third numeric value, performing the logic operation on a result of the one-way calculation and the late-stage OTP to generate a second certification code, and transmitting the second value, the first key and the second certification code to the handheld device; and (d10) determining, using the handheld device, that the second numeric value is equal to a first verification value generated by performing the one-way calculation on the first numeric value twice so as to confirm that the early-stage certification has been completed;

in the late-stage certification, the step (d) further comprises the following steps:

(d11) performing, using the handheld device, a bilinear mapping operation on the first private key and the first key to generate a second key;

(d12) choosing, using the handheld device, the late-stage OTP seed from the first OTP seed set according to the time numeric value, and performing the OTP generator function operation on the late-stage OTP seed to generate the late-stage OTP;

(d13) performing, using the handheld device, the logic operation and the one-way calculation on the second certification code and the late-stage OTP to generate a fourth numeric value, and transmitting the second key and the fourth numeric value to the terminal recording device;

(d14) determining, using the terminal recording device, that the fourth numeric value is equal to a second verification value generated by performing the one-way calculation on the third numeric value twice; and (d15) determining that a third key generated by performing the bilinear mapping operation on the first public key and the second public key is equal to the second key so as to confirm that the late-stage certification has been completed.

8. The access control method as claimed in claim 7, wherein the first public key is generated by inputting the user identification into a hash function, and the first private key is generated according to the first public key and a cyclic group.

9. The access control method as claimed in claim 7, wherein the logic operation is an exclusive OR (XOR) operation.

10. The access control method as claimed in claim 7, wherein the one-way calculation is a one-way hash function operation.

* * * * *